United States Patent [19]
Hochman et al.

[11] 3,786,471
[45] Jan. 15, 1974

[54] SECURITY MAINTENANCE SYSTEM

[76] Inventors: Herschel T. Hochman, 7809 Second Ave. S., St. Petersburg, Fla. 33707; Dennis L. Hogan, 6999 31st Ter. North, St. Petersburg, Fla. 33710

[22] Filed: Apr. 5, 1971

[21] Appl. No.: 131,056

[52] U.S. Cl............... 340/274, 70/263, 70/DIG. 17, 340/149 A
[51] Int. Cl.. G08b 19/00, E05b 45/10, E05b 47/00
[58] Field of Search............... 340/274, 280, 149 A, 340/147 R; 70/264, 263, 262, DIG. 17, DIG. 49, DIG. 44, 150; 234/94

[56]  References Cited
UNITED STATES PATENTS

| | | | |
|---|---|---|---|
| 3,662,342 | 5/1972 | Hedin et al. | 340/274 |
| 3,544,984 | 12/1970 | Hanson | 340/280 |
| 3,622,991 | 11/1971 | Lehrer et al. | 340/147 R |
| 3,239,815 | 3/1966 | Martens | 340/149 A |
| 3,403,380 | 9/1968 | Welch | 340/149 A |

*Primary Examiner*—John W. Caldwell
*Assistant Examiner*—Glen R. Swann, III
*Attorney*—Connolly & Hutz

[57]  ABSTRACT

A security maintenance system includes an area keyport adjacent a locked barrier at the entrance of a restricted area with a master console disposed remote from the area keyport. The master console has a plurality of individual master keyports. Coded key means are provided for insertion into the area keyport and a master keyport. Scanning means are provided for the master console in conjunction with comparison means between the area keyport and master keyports for cyclically scanning the keyports and inactivating the locked barrier to permit entry to the restricted area when the area keyport and master keyport have identical coded key means inserted therein.

30 Claims, 21 Drawing Figures

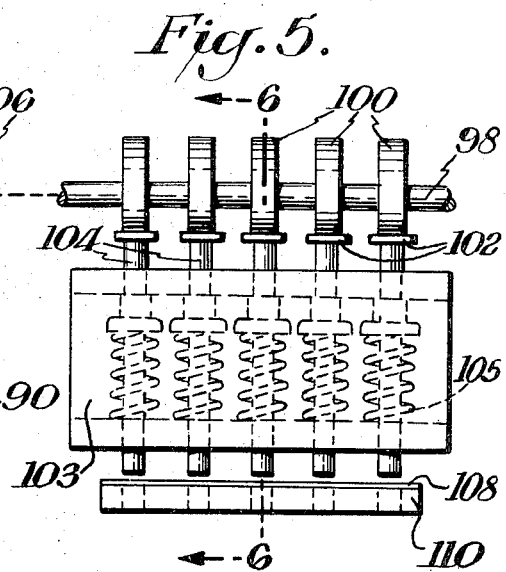
Fig. 5.
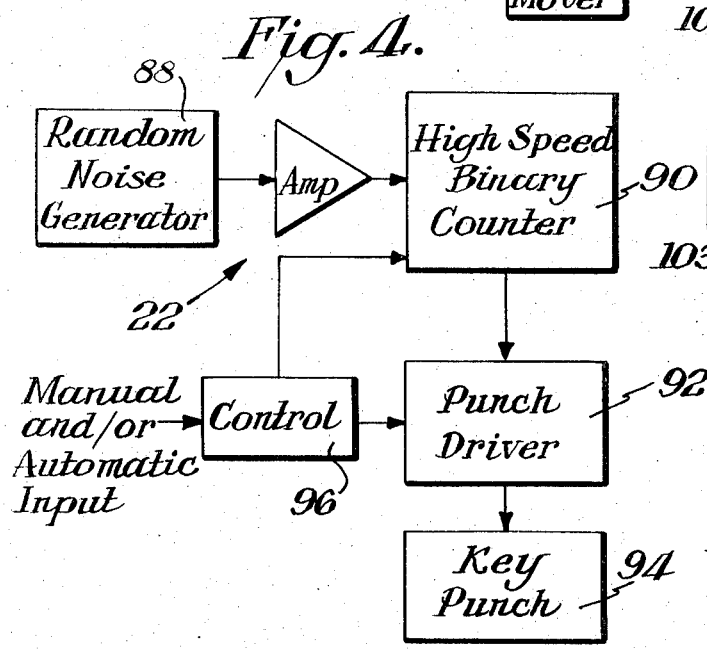
Fig. 4.
Fig. 6.
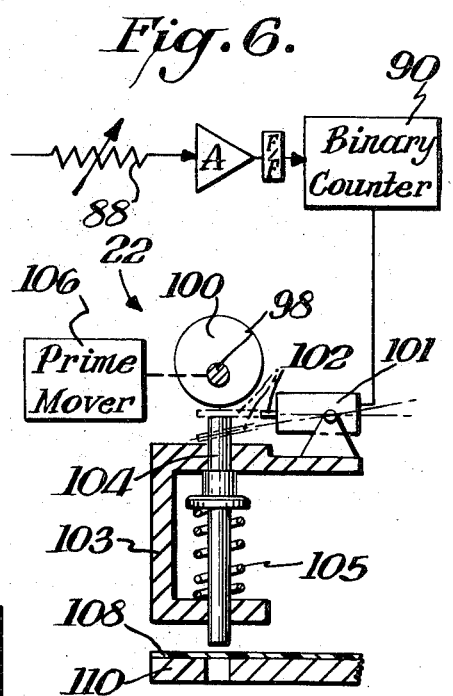
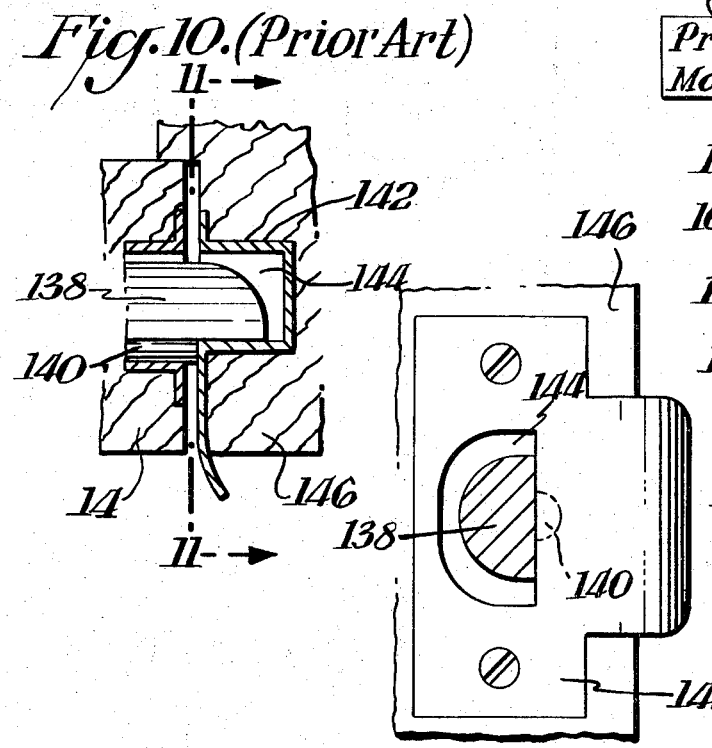
Fig. 10. (Prior Art)
Fig. 11. (Prior Art)

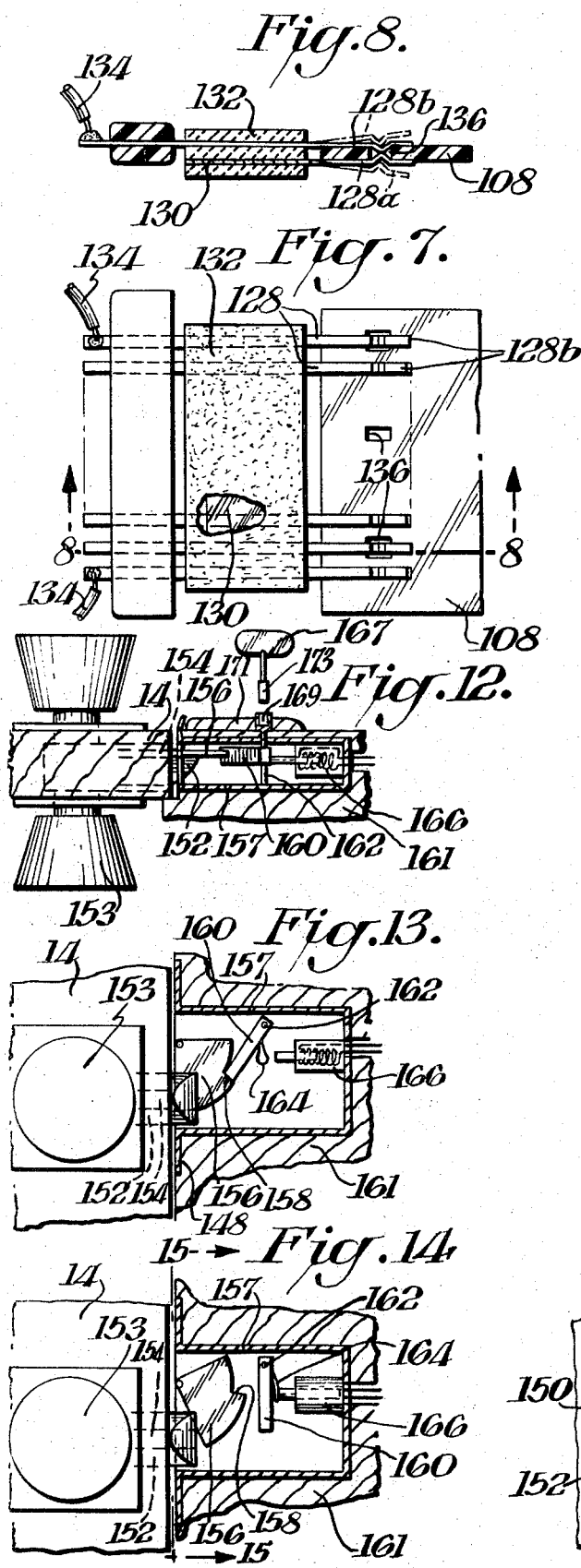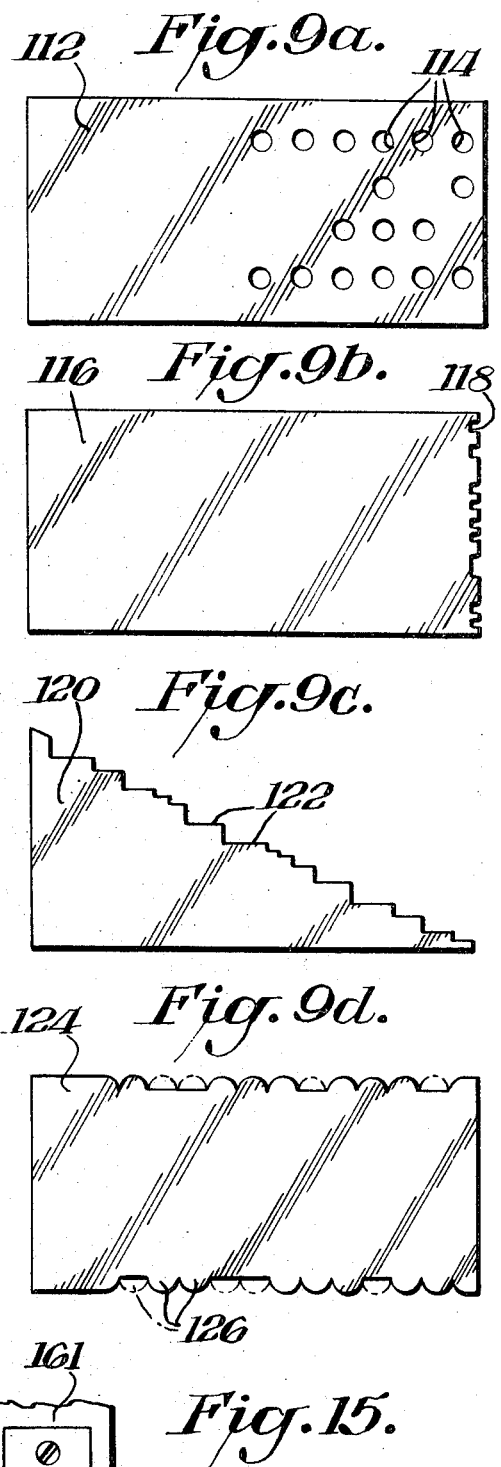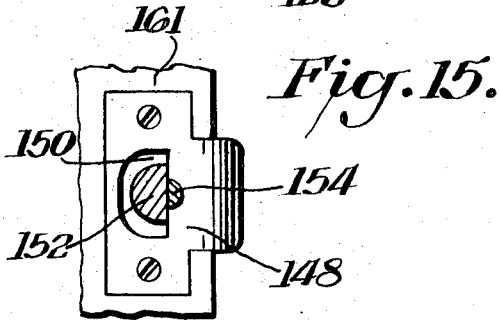

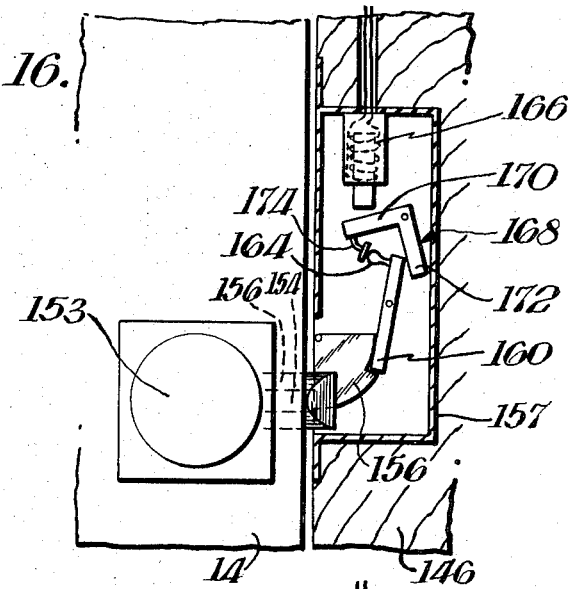
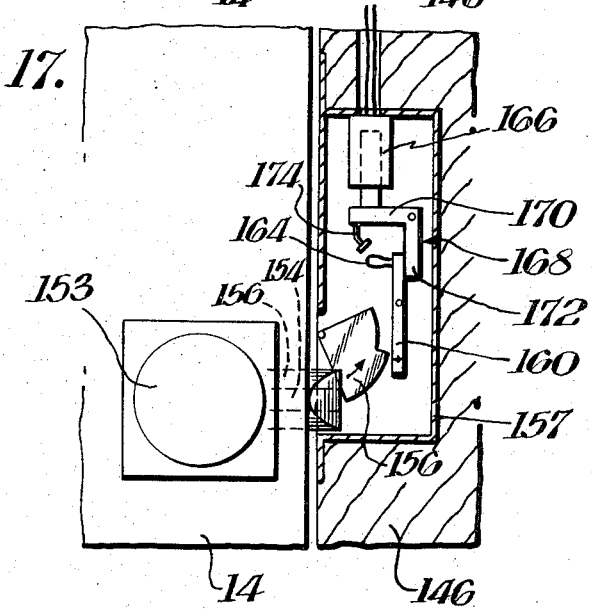

SECURITY MAINTENANCE SYSTEM

BACKGROUND OF INVENTION

There are presently available electronic devices which monitor and detect and feedback information to a master control. There are also systems available which require various techniques for entrance to any area. For instance, doors can only be opened by the insertion of a special key in the form of a card which is supposedly being used by a particular person. These systems operate by means of various detecting devices such as electric photocells, frequency variation of sound and heat. However, none of these systems offers absolute security both in terms of the allowable person and also the controlled entry times.

Illegal entry and theft constitute a major dollar loss all over the world and are becoming a greater menace each day. This problem is not being solved due to a lack of proper surveillance and detection devices and equipment. In particular, this problem is most severe wherever there is great movement of personnel or a large number of transient personnel. This problem immediately focuses on hotels, motels, schools, convention centers, etc.

Some of the prior art attempts are exemplified in U. S. Pat. Nos. 3,441,808; 3.392,558; 3,239,815; 3,134,254; 2,909,711; 3,450,953; 3,344,629; 3,443,069.

SUMMARY OF INVENTION

An object of this invention is to provide a security maintenance system which not only controls the personnel that may enter the restricted area but also controls the time of entry.

A further object of this invention is to provide such a system which permits elimination of the expensive lock and key replacements which are required with conventional locking systems.

A still further object of this invention is to provide such a system which not only maintains security over the entrance of a restricted area but also acts as surveillance means to monitor various conditions in the area.

A still further object of this invention is to provide such a system which incorporates a novel manner of forming a disposable coded key with an unlimited number of combinations.

In accordance with this invention a security maintenance system includes an area keyport adjacent a locked barrier at the entrance of a restricted area with a master console disposed remote from the area keyport. The master console has a plurality of individual master keyports. Coded key means are provided for insertion into the area keyport and a master keyport. Scanning or sampling means for the master console in conjunction with comparison means are provided between the area keyport and master keyports for cyclically scanning or sampling the keyports and inactivating the locked barrier to permit entry to the restricted area when the area keyport and master keyport have identically coded key means inserted therein.

The information from the the restricted area is fed back almost instantaneously to the master console at a central location at which time appropriate action is taken either electronically or manually. For example in a hotel or motel when a guest inserts the card in a keyport adjacent his room the key code information is fed back to the central desk and a comparison means detects that matched cards are in the master console and area keyport thus permitting the guest to enter his room.

In accordance with a further aspect of this invention a coded key is economically produced in a novel manner whereby the key may be discarded and new sets of keys readily made at, for example, check-in time of an arriving guest or if a key is lost. This may be accomplished without requiring a complete change-over in the locking system and only requires the making of a new set of coded keys.

In accordance with a further aspect of this invention an improved locking system is provided which is particularly suitable with this invention.

THE DRAWINGS

FIG. 4 is a block diagram schematically illustrating the manner in which the coded keys are formed in accordance with this invention;

FIG. 5 is a front elevation view of a key forming device in accordance with this invention;

FIG. 6 is a cross-sectional view taken through FIG. 5 along the line 6—6;

FIG. 7 is a plan view showing a coded key inserted in a keyport in accordance with this invention;

FIG. 8 is a cross-sectional view taken through FIG. 7 along the line 8—8;

FIGS. 9a–9d are plan views of alternative forms of coded keys;

FIG. 10 is a cross-sectional plan view of a prior art lock;

FIG. 11 is a cross-sectional elevation view of a prior art lock taken through FIG. 10 along the line 11—11;

FIG. 12 is a cross-sectional plan view of a locking arrangement in accordance with this invention;

FIGS. 13–14 are cross-sectional elevation views of the arrangement shown in FIG. 12 in different phases of operation;

FIG. 15 is a cross-sectional view taken through FIG. 14 along the line 15—15; and FIGS. 16-17 are views similar to FIGS. 13–14 of an alternative arrangement.

DETAILED DESCRIPTION

Figure 1:
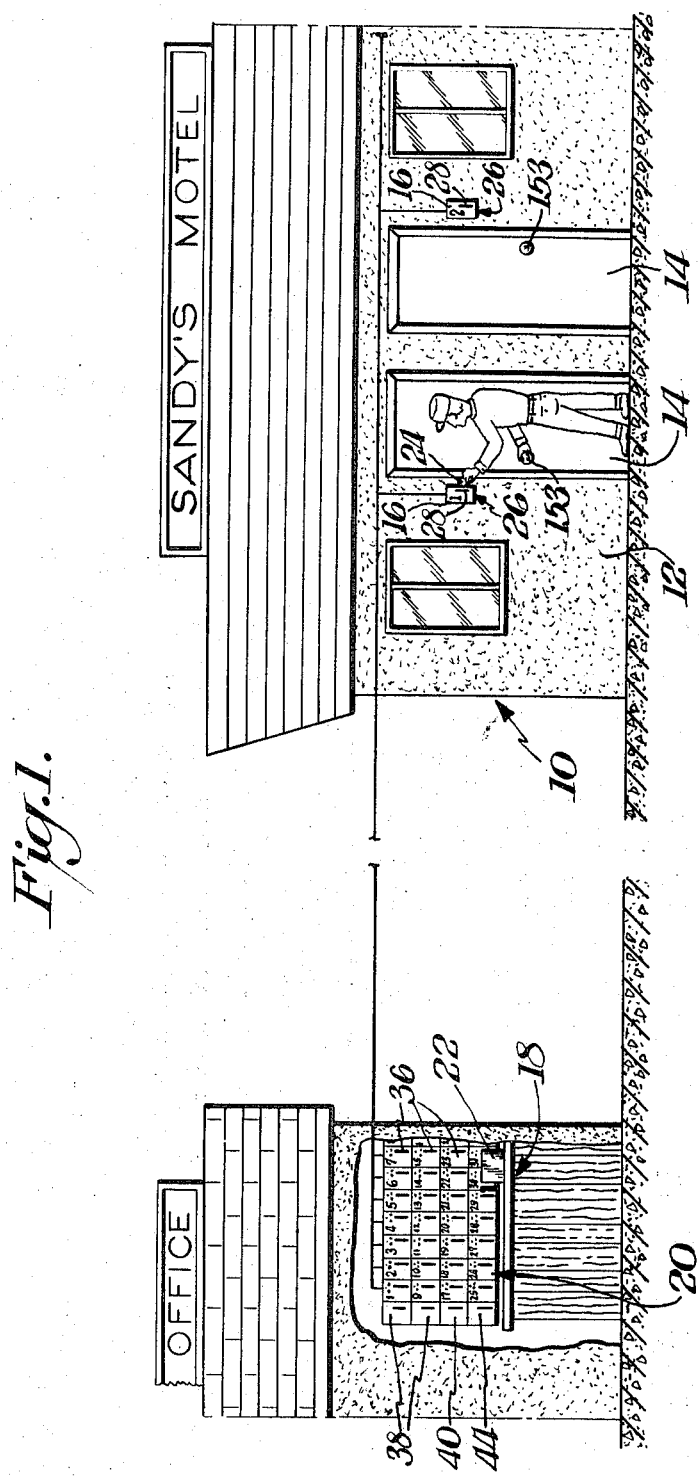
FIG. 1 is an elevation view schematically illustrating a security maintenance system incorporated in a motel in accordance with this invention.

FIG. 1 illustrates a security maintenance system 10 in accordance with this invention in use in a motel. Obviously the concepts of this invention may equally be applied to other environments such as hotels, schools, convention centers, etc. As indicated in FIG. 1 each guest room 12 is generally considered a restricted area having a locked barrier in the form of a door 14 for preventing unauthorized entrance to the room. Adjacent door 14 is an area keyport 16. Each area keyport 16 may be considered as located in a monitor station. FIG. 1 also illustrates a central location or office 18 which includes a master console having a plurality of keyports duplicating the monitoring station keyports hereafter called console guest keyports, plus console master keyports as required for authorized persons other than guests. Also located at this master control station is a key manufacturing device 22.

In general when a guest registers at office 18 a set of coded keys is made by device 22 and one key 24 is given to the guest. The other key is inserted in the proper console guest keyport corresponding to the guest's room. Thereafter when the guest inserts his coded key 24 into keyport 16, as later described a comparison device detects the presence of matched coded keys in keyport 16 and at master console 20 which unlocks door 14 to permit the guest to enter his room 12. As also later described entry into the room is prevented unless there are a pair of such matching keys in the area keyport 16 and at the master console 20. Thus if a key is lost or if a new guest checks into the room, a new set of keys is made and one key of the new set replaces the former key in the master console to prevent entry by means of the former guest key. As also later described master console 20 includes a guest keyport corresponding to the number of doors plus a plurality of master keyports, each master keyport having the capability of accepting a correctly coded key which will open a plurality of doors so that other authorized personnel such as a maid or maintenance man may enter the room when such other personnel inserts a key into keyport 16 which matches the appropriate key in a master keyport in master console 20.

Figure 3:
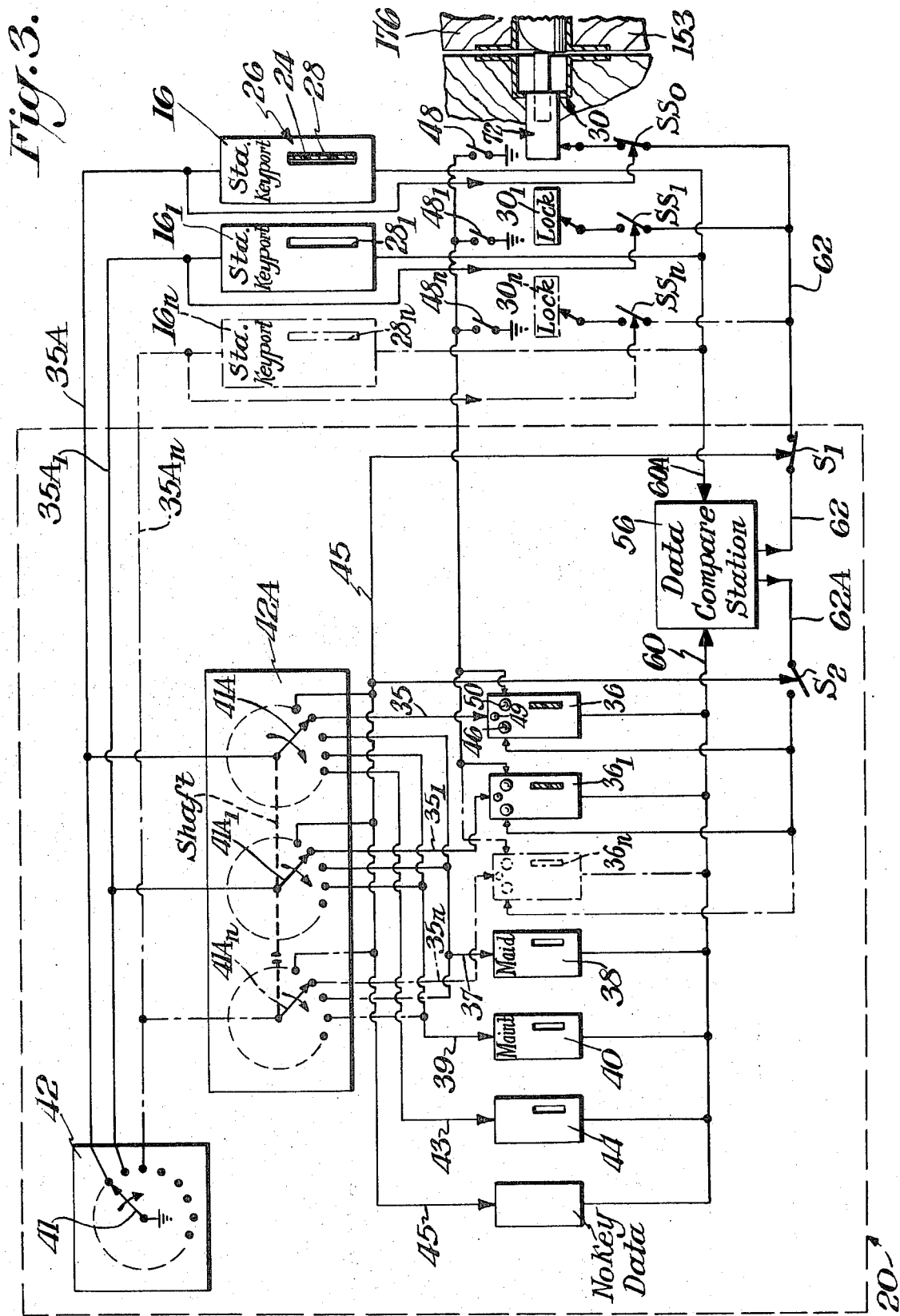
FIGS. 3 and 3A are wiring diagrams schematically illustrating the principle of operation of this invention.

FIG. 3 schematically illustrates the basic concept of this invention. As indicated therein the data from keyport 16 is transmitted to data compare station 56 wherein a comparison is made with one of the keyports from the master console 20. In this respect scanning means in the form of a station address generator 42, and phase address generator 42A are provided whereby a plurality of individual keyports in the master console may be sequentially compared with the station keyport 16. Thus as schematically illustrated in FIG. 3 during a single address time of station address generator 42 a plurality of phases sequentially occur. For example in one phase a comparison would be made of the guest keyport 36 with station keyport 16 and in subsequent phases of the same address time keyport 16 would be compared with keyports 38, 40 and 44 respectively. It is to be understood that keyport 44 represents any number of master keyports in accordance with the desired results. If data compare station 56 indicates that matching coded keys are in keyport 16 and one of the programmed console keyports, this information is transmitted to lock 30 thus permitting the lock to open. The general arrangement also includes an alarm 46 which is actuated on master console 20 when, for example, data compare station 56 detects an improper key in keyport 16 which does not match any of the authorized keys for keyports 36, 38, 40 and 44. Similarly, through use of common wiring the master console includes a signal 50 by the maid to indicate, for example, when the room is ready for occupancy. Signal 50 would be actuated by a maid closing switch 48 in or around the guest's room. The signal or light would remain on until switch 49 at the master console is actuated. Any number of such signals may be used in accordance with the desired results.

As is readily apparent countless conditions might be sensed with this arrangement, such as whether or not air-conditioning or other equipment is properly operating. The increased surveillance function might, however, increase the time period for one cycle.

FIG. 3 is referred to for further detaied description. As indicated therein the data from keyport 16 is transmitted through cable 60A to data compare 56 when station 16 is addressed via the station address generator 42 and conductor 35A. For example, cable 60A consists of a given number of conductors such as 23 in accordance with the needs of the system. The conductors are each attached to particular inputs of the data compare 56 which is a multi-input exclusive OR gate which has as many inputs as required. Each conductor is compared as to a presence or absence of a voltage on each conductor and any set of conditions is called the data thereon. The station address generator 42 also addresses the corresponding console guest keyport 36 through phase generator 42A at the same instant. This address causes data from console guest keyport 36 to be transmitted through cable 60 (similar to cable 60A) to particular inputs of the data compare 56. The respective addressing conductors in the console are indicated as 35, $35_1$, $35_n$ 37, 39, 43 and 45, and to the keyports they are 35A, $35A_1$ and $35A_n$. Conductor 45 is illustrated in FIG. 3 to indicate that a portion of the cycle is devoted to detecting tampering or malfunctioning. The multiplexer switch 41 which may be an absolute switch of the commutator type or a mechanical commutator or its electrical equivalent sequentially moves from one position to another defining the station address time interval. Further, switches 41A, $41A_1$ through to switch $41A_n$ may be absolute switches of the commutator type or mechanical commutators or their electrical equivalent. They are ganged together such as being mounted on a common shaft so that they all sequentially progress in unison. Their rate is one complete cycle per station address time. The time each switch rests in one position is a phase time for purposes of discussion, and there are as many phases as required by the system. The phase time is the minimum time of key code comparison or data transmission. Typically, the phase time is 1/1,000 second, which could vary depending on the system constraints.

If each of the corresponding data input lines from the console guest keyport 36 and the keyport 16 correspond, a signal is transmitted thru compare signal line or cable 62 to release lock 30. Switch $SS_0$ is closed for this operation via address signal on conductor 35A. Switches $SS_1$ through $SS_n$ are closed sequentially via respective address signals on cable $35A_1$ through $35A_n$. If the data do not compare, phase generator 42A sequentially moves to the next phase wherein, as illustrated, data from keyport 16 is compared to that of the maid keyport 38. If data compares, lock 30 releases, if not, the phase generator 42A sequentially moves to the next phase wherein, as illustrated, data from keyport 16 is compared to that of the maintenance keyport 40. This sequencing continues until all possible phases have been compared. The last of the phases is reserved to compare for a "no-key" condition in keyport 16. During the no-key comparison phase, switch $S_1$ is opened to disallow lock 30 from releasing if there is a comparison, and $S_2$ closes to allow a no-comparison signal to traverse to the guest console keyports. The operation is as follows:

If there has been no previous comparison on any compare phases of this address time as determined by the data compare station, and if there is no comparison on this tamper phase, a signal is emitted on the "no compare signal line" (62A). This signal indicates a malfunction or tampering concerning keyport 16. Since $S_2$ is closed via conductor 45 the signal traverses to all guest console keyports, but only alarm 46 is initiated because only guest console keyport 36 is addressed. After the last phase of keyport 16 has been examined, the station address generator 42 sequentially moves to the next keyport $16_1$ and the phase sequence is repeated for that keyport. $16_1$ data is transmitted to data compare 56 only when keyport $16_1$ is addressed by station address generator 42. At the same time 42 addresses its corresponding console guest keyport $36_1$. During the first phase time period of this address, keyport $16_1$ data and console guest keyport $36_1$ data are compared. During the second phase, keyport $16_1$ and the maid keyport data, then the maintenance keyport data, etc.

Figure 3A:
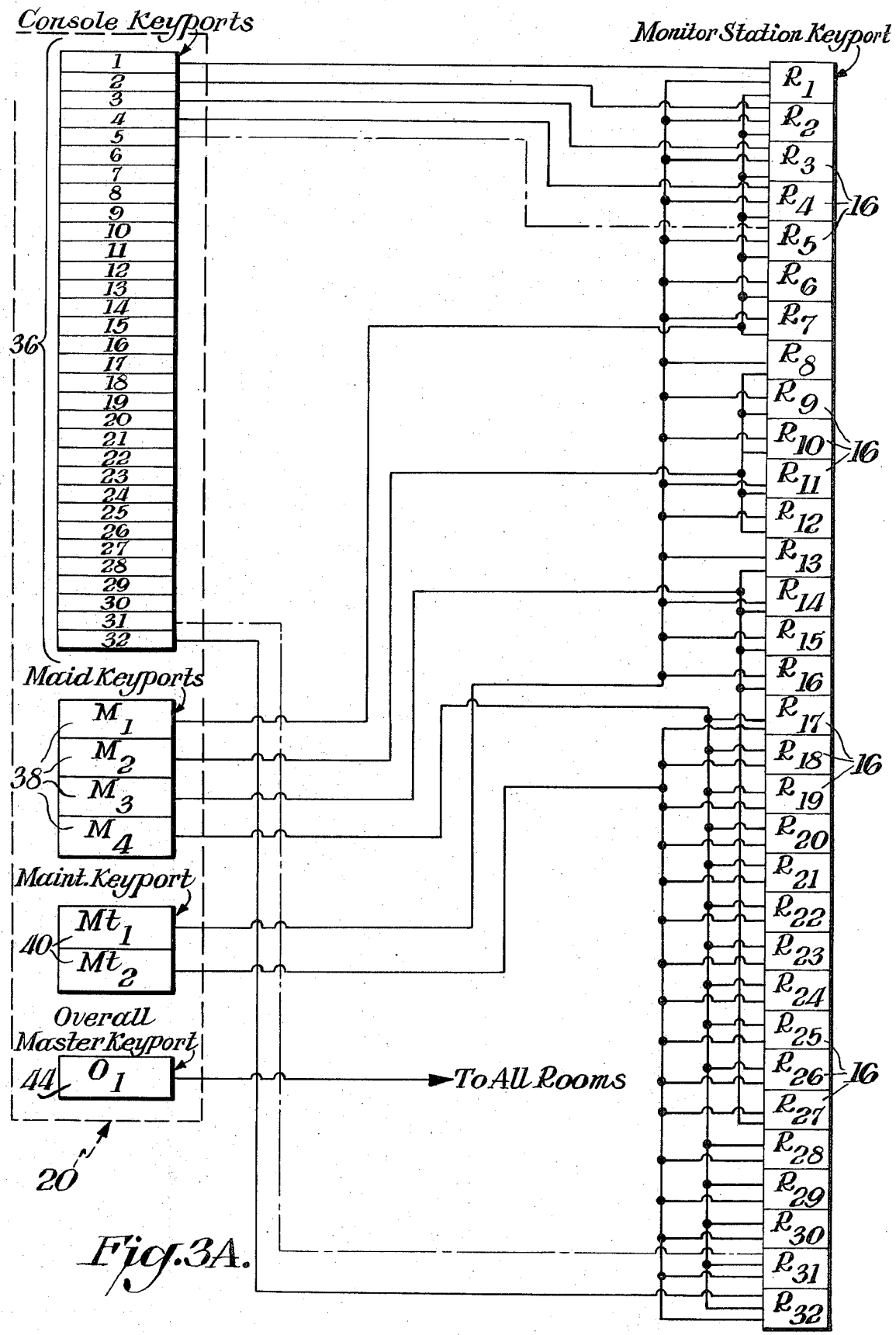

While each console guest keyport will correspond to only one monitoring station keyport, this invention allows a particular keyport to concurrently correspond to one or more console master keyports. An example system configuration is illustrated in FIG. 3A. The example therein demonstrates that one keyport may respond when any one of several correct keys are inserted into the keyport. Further, the example shows a possible grouping arrangement. As indicated therein 32 station keyports 16 are provided for 32 individual rooms $R_1$, $R_2, \ldots R_{32}$. The master console 20 contains 32 individual guest keyports 36 each corresponding to a particular station keyport. The master console is also provided with four maid keyports 38, two maintenance keyports 40 and one overall master keyport 44. (In FIG. 3 keyport 44 schematically represents any arbitrary keyports). Thus the maid keyports correspond to groups totaling 32 rooms, each maintenance keyport corresponds to 16 different rooms, and the single overall master keyport is provided for all rooms. In a practical example, consider room $R_{27}$. If a key corresponding to the key in console guest keyport $36_{27}$ is inserted into the station keyport, the door will unlock. Insertion of a key corresponding to the key in maid keyport $M_3$ will open the door, insertion of a key corresponding to the key in maintenance keyport $Mt_2$ will open the door, and finally in this example, a key corresponding to the key in master keyport 44 will open the door. This invention is not intended to be limited by the number of keyports, console guest keyports, maid keyports, or any type or number of master keyports. Further, the phase order in which data comparisons are made or grouped, or method of addressing keyports and/or console keyports and/or other master keyports specifically described herein to explain the concepts are not intended to limit the invention.

In addition to directing the unlocking of various doors in the system, the station address generator 42 in conjunction with the phase generator 42A need not necessarily keycode data comparison on each phase. Other important auxiliary data may be transmitted from the room to the master console during some phases such as room ready information or room temperature above or below given limits. This type of information could be detected during a keycode comparison phase with the addition of more wires in the interconnecting cable. Thus, since a multitude of data might cause the number of phases required to become large thus causing the system cycle time to become very long, additional data is transmitted concurrently during keycode compare phase. A desirable total system surveillance time is less than 2 seconds.

The order of phasing described above is not intended to limit this invention. The system's flexibility allows any order to phasing to yield desired results. For instance, it may be desirable to compare the keyport data to the no-key condition first; if a conparison is obtained, and all necessary auxiliary data is obtained during this first phase, skip or by-pass the other phases and update station address generator 46 to the next keyport. This will reduce system cycle time. If there is a no-comparison, something is in the keyport - thus the other phases will be scanned. If a comparison is reached during any keycode phase, the remainder of the phases are skipped.

Operating in this manner allows an automatic generation of a tamper signal, i.e., utilizing the last phase as a tamper or malfunction detection phase, it will only be reached if no valid comparison has been reached on the other phases of the address time. As stated before, if a valid comparison was reached on an earlier phase, the remaining phases including the tamper or malfunction detection phase are skipped.

Figure 2:
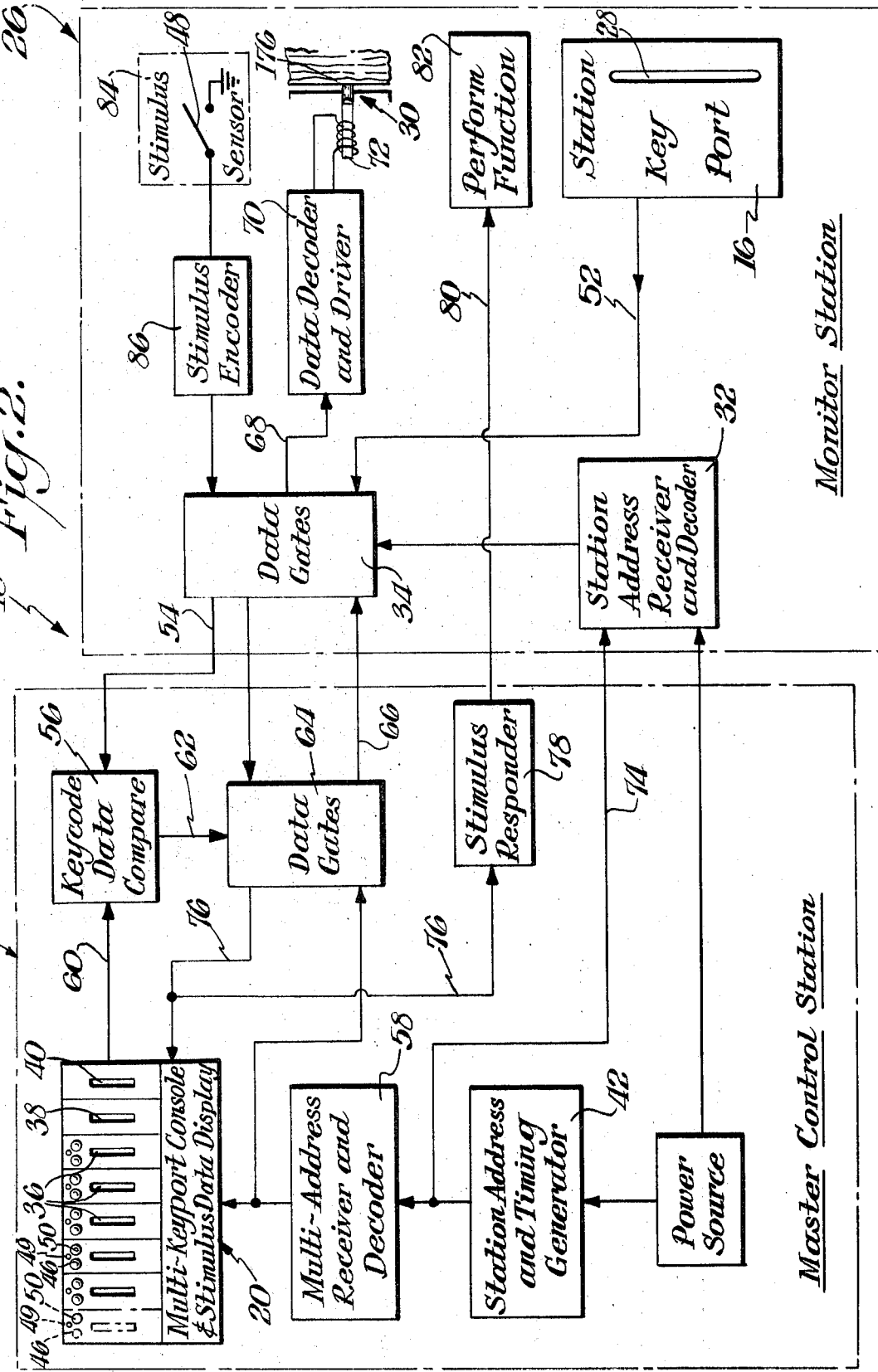
FIG. 2 is a block diagram schematically illustrating the electrical connections between the various components in a monitor station and the master control station in accordance with this invention.

FIG. 2 schematically illustrates in still further detail the interrelationship between the components at a monitor station 26 and at master control station 18. It is to be understood that a different monitor station would be provided for every room in conjunction with a corresponding console guest keyport in a master control station located at a central location. As indicated in FIG. 2 an area keyport 16 is provided with a slot 28 for receiving a coded key such as from a guest or other authorized personnel. Insertion of a coded key into slot 28 initiates a signal which generates a stimulus such as pressure, heat or light to create electrical conduction. Monitor station 26 through its electronic components is capable of sending signals back to a receiving station or control station for instructions based upon the detected signal and can receive signals from a master control and respond by initiating appropriate action. For example as illustrated in the various embodiments of this invention, monitor station 26 has either mechanically or either electrically connected to it means for operating a door latch 30 to permit entry into a restricted area such as room 12.

The system 10 is in continuous operation and station addressed signals are received continually in the station address receiver and decoder 32. The decoder 32 recognizes the particular station key opening slot or port 28 and puts out a gate signal into data gate 34. The gate signal is further segmented into phases and each phase can be addressed individually within the gate time. Thus when the station is addressed the control console devotes its attention to that particular station and in particular to that particular phase. Each phase is in a preprogrammed time period which is used to interrogate until all stimuli have been examined. As also illustrated in FIG. 2 master console 20 includes console guest keyports 36 corresponding to each door plus console master keyports 38, 40 which allows specific authorized personnel other than guest to enter any one of a plurality of rooms. There is only one console master keyport for each auxiliary function or person, i.e., housekepper, maintenance, engineer. Thus, for example, keyport 36 may correspond to the guest keyport. Keyport 38 may correspond to the maid's keyport and keyport 40 may correspond to a maintenance man's keyport. Obviously as previously noted any number of keyports may be provided although only three are shown for illustrative purposes.

In the embodiment shown in FIG. 2 if a key is inserted in slot 28 the data traverses common cable 52 to data gate 34 and thence through cable 54 to key code data compare station 56. In the meantime as previously described station address generator 42 through receiver and decoder 58 sequentially selects an appropriate keyport from console 200 which sends its data through cable 60 to key code data compare 56 for a comparison with the data sent through cable 54. If the data is correct the input data returns through cable 62 into data gate 64 and through cable 66 back to data gate 34 and then through cable 68 to decoder and driver 70 for actuating lock 30. As schematically illustrated in FIG. 2 the actuation is accomplished by means of solenoid 72 whereby the authorized personnel may enter room 12.

If the data received in compare station 56 does not match such as when an incorrect key is inserted in keyport 16, no activation of solenoid 72 results. Advantageously, as noted above the key recognition is a multiphase operation to conserve on the number of wires in cable A rather than being a single phase. As also previously indicated if a foreign key or illegal entry is attempted this is sensed at compare station 56 which results in an alarm 46 being indicated at the master console. The same result occurs if there is a break in any of the wires since this would cause an abnormal comparison to be made at station 56.

It is to be understood that this invention is not limited to the above described order of interrogation and also that the invention may be practiced by surveillance examination of two or more stimuli during any one or more phases. The simultaneous transmission of stimuli data would merely require additional wiring to accommodate a plurality of stimuli data being carried at the same time.

As shown in FIG. 2 station address and timing generator 42 produces a sequentially varying signal which can be detected at any one time as being of definite digital value. Generator 42 generates, for example, a series of a predetermined number of events from which a like number of distinct selections can be made as it recycles continuously or may be indefinitely interrupted as desired. Typically generator 42 recycles continuously and its output feeds cable 74 and inputs multiaddress receiver and decoder 58. An alternative arrangement would be to allow generator 42 to operate in two modes, at a high rate and at a low rate. The particular mode would be selected depending upon whether or not a key is sensed in the guest key comparison phase. This would require that a minimum of the tamper sensing phase be interrupted. If no key is in slot 28 all other phases would be skipped. Thus a signal from the key code comparison station 56 would hasten the system to the next station. If, however, a key is present in keyport 28 all phases may be examined.

As also illustrated in FIG. 2, system 10 includes surveillance means for accomplishing any predetermined operation in conjunction with generator 42. In this respect generator 42 would devote a segment or phase of its cycle to compare the predetermined condition at comparison station 56 which in turn would send a signal through cable 62 into data gate 64 and then through cable 76 into stimulus responder 78 from stimulus responder 78 the data would be transmitted through cable 80 to any suitable performance functioning means 82 when there is a matched comparison sent by stimulus sensor 84 through encoder 86 into comparison station 56.

Although any suitable equipment may be used in accordance with this invention, the following exemplifies such equipment as listed in the 1971 *Allied Electronics Industrial Catalog*. Multiaddress receiver and decoder 58 may be one or more SN74154N 4 line to 16 line Decoder/Multiplexer (p. 50). The generator 42 may be 9266966 capacitors (p. 168), resistors (p. 117), 2N3704 transistors (p. 31) and diodes similar to IN270 (p. 17) and a number of SN7473N Dual J/K Flip-Flops. The data compare station may incorporate a series of SN7486N Quad 2 input Exclusive OR Gates (p. 50) and SN151802N 8 input Expandable NAND Gate (p. 52). The data gates 34 may be buffer gates SN15836N (p. 52), SN15858N Quad 2 input NAND gate (p. 52) and MC84OP Hex Inverter (p. 60). Stimulus responder 78 may also include SN15858 power gate (p. 52) and SN7475N Quad Bistable Latch (p. 50). Data gates 34 and stimulus encoder 86 may be diodes matrix consisting of diodes similar to 1N645 (p. 17) and SN151810N Quad 2 input NOR gates (p. 52). Station address receiver and decoder 32 may be the same as receiver and decoder 58 but spread out in sub-stations. Data decoder and drive 70 may consist of transistors similar to 2N697 (p. 27) and SN15849N Quad input NAND-NOR Gates (p. 52). It is to be understood that this equipment is merely exemplary and is not intended to limit the invention. For example any suitable comparator may be used such as of the type disclosed in U. S. Pat. No. 3,662,342 or generally referred to in U.S. Pat. No. 3,622,991.

In an advantageous form of this invention the coded keys are suitable cards which may be made of a disposable material so that new sets can be conveniently made when for example one of the cards is lost or when a guest checks into a hotel or motel. FIG. 4 schematically illustrates an arrangement 22 for manufacturing the coded cards. As indicated therein a random noise generator 88 is provided which generates noise in a random manner to high speed binary counter 90 and is stopped at any arbitrary time to position a random arrangement of punch drivers 92 for actuating punches 94 which form a random arrangement of holes in a card. The arbitrary stopping of the random noise generator and the actuation of the punches may be controlled through station 96. In an exemplary form of this invention noise generator 88 may be commercially available 2,000 ohm RC20 stock no. 962C 1,800 such as listed in the 1971 *Allied Electronics Industrial Catalog*. Similarly, a suitable counter 90 may be a commercially available SN15809 dual JK Flip-Flop as listed on page 52 of the 1971 *Allied Electronic Industrial Catalog*. Other suitable prior art noise generators may also be used such as of the type generally disclosed in U. S. Pat. No. 3,662,991.

FIGS. 5–6 illustrate a mechanism for the arrangement 22 for coding the keys. As indicated therein a shaft 98 is provided with a suitable number of cams 100. Disposed adjacent the cams are a corresponding number of pivotally mounted solenoid housings 101, each having a solenoid 102. In accordance with the random arrangement transmitted from counter 90 a like random arrangement of solenoids is extended to a position between its respective cam 100 and a respective punch 104. Each punch 104 is mounted in channel shaped housing 103 and urged upward by spring 105. The prime mover 106 which would be actuated by control 96 would then cause shaft 98 and its cams to rotate. This rotational movement may simply be imparted by the rotational movement of a crank arm. As each cam rotates certain of the cams will contact its solenoid 102 to cause its punch 104 to be depressed thereby punching a hole into a plastic card 108 arranged on a suitable platform 110. If a solenoid is not present the cam will continue to rotate without actuating any punch. In this manner a random arrangement of punched holes is created in card 108 in accordance with the random noise from generator 88. Although FIG. 6 illustrates only one card 108 to be present, two or more cards would be inserted on plateform 110 so that a plurality of cards are simultaneously made. When a guest checks-in, one or more of the cards would be given to the guest and one card would be retained by the clerk. The clerk would then remove the card which had been in the console guest keyport slot 36 so that the new card could then be inserted therein. As previously described a guest would then be able to enter his room by insertion of his card into keyport slot 28 by a match being detected at comparison station 56.

Any suitable material such as plastic, steel or ceramic, etc., may be used for cards 108 with the primary determinations being the cost factor and the specific method of coding that is utilized. Similarly, instead of forming the key with a card having a line of random openings, the key may take other forms. FIG. 9a illustrates one form of key 112 wherein the coding is achieved by openings 114 randomly arranged throughout the card. FIG. 9b illustrates a key 116 formed by randomly arranged notches 118 at one edge thereof. FIG. 9c illustrates the coding on key 120 to be accomplished by randomly arranged step configurations 122. FIG. 9d illustrates the coding on card 124 to be provided by randomly arranged tabs 126. As is readily apparent the number of code variations on any key is unlimited. In practical applications this would vary from 8 million to 16 trillion. Thus it is assured that the possiblity of non-simultaneous duplication of any key is virtually eliminated.

Any suitable code detection means may be used in the keyports, such as magnetic sensors which detect magnetic materials within the key, photo sensors which detect holes or relfecting material within the key or mechanical pins locating themselves within the key holes. FIGS. 7-8 illustrate one form of code detection which is particularly suitable with this invention. As indicated therein the keyport is provided with a plurality of pairs of electrically conductive spring fingers 128 arranged over a width generally corresponding to the width of coded card 108. One set of spring fingers 128a is stamped from a common conductive spring material which may be grounded, while the other set of fingers 128b is embedded in a dielectric chip 132 from which suitable electrical connections 134 are taken. As is readily apparent from FIGS. 7-8 where openings 136 have been punched into card 108 the pairs of fingers 128a and 128b contact each other to make an electrical connection. Where the card is solid, however, the pairs of fingers are insulated from each other so that no electrical connection is made. Thus a set of voltage is created in accordance with the coding of card 108. When identical cards are present in an area keyport 16 adjacent room 12 and in a corresponding keyport in the master console 20, the match is detected or sensed at comparison station 56 and the door to room 12 may be opened. It is particularly noteworthy that the same keyport 16 may be utilized for selectively receiving different cards from any number of different authorized personnel which would result in the opening of door 14 as long as a corresponding keyport is provided on master console 20 to receive a card which is a duplicate of the particular card used by the authorized personnel.

Electrical contact need not be made continuously. Another method of achieving the desired results would be to have a body containing a plurality of insulated finger-like protrusions (such as switches, Model E63 - Cherry Electrical Products, Inc.) which upon depression by the inserted card causes electrical contact to be made within the body.

In accordance with a further aspect of this invention a novel locking system is used which is particularly adaptable for inclusion in system 10. For a better understanding of this locking arrangement reference is made with FIGS. 10 and 11 which illustrate a conventional prior art arrangement. As indicated therein the conventional lock includes a lock bolt 138 and a night latch 140. As indicated in FIG. 11 the strike plate 142 has an opening 144 which is shaped in such a manner as to prevent the night latch 140 from moving past the strike plate on the door jamb 146. With such conventional arrangements the retracted night latch 140 prevents lock bolt 138 from being retracted by means other than turning of the door knobs (i.e., prevents retraction of the lock bolt by an external force such as a knife blade). This mechanism has nothing to do with the locking of the door either by an exterior door knob key or an interior doorknob button or twist lock.

FIGS. 12-15 illustrate an improved locking arrangement in accordance with one aspect of this invention. As illustrated in FIG. 15 strike plate 148 includes an opening 150 shaped to permit both the lock bolt 152 and night latch 154 to pass therethrough. With this arrangement lock bolt 152 and night latch 154 are suitably interconnected so that the lock will open only when the night latch is extended. This might be accomplished in any suitable manner such as by removing a small section of the bolt in a conventional Schlage or Russwin type lock. Means are also provided to maintain the night latch retracted for preventing opening the door. As shown in FIG. 13 the means include a metal latch block 156 which abuts against night latch 154 to hold it in a retracted position. Latch block 156 includes a shoulder 158 for receiving the end of locking lever 160 pivoted at 162. A leaf spring 164 is provided to urge the locking lever 160 against latch block 156. The resilient force of spring 164 is overcome by energization of electromagnet 166 so that, as illustrated in FIG. 14, lever 160 is pivoted away from latch block 156. Night latch 154 is spring loaded and is thereby able to be extended pushing aside the latch block 156 whereupon the door may be opened.

In operation when the door is in a closed position with the night latch retracted as illustrated in FIG. 13, the outside doorknob may be either locked in a fixed position or may be free wheeling. Upon insertion of a proper key card into the keyport, electromagnet 166 is energized moving the various latch components to the position illustrated in FIG. 14 wherein night latch 154 is extended due to spring pressure within the lock set. If the doorknob 153 is of the fixed position type it would be disengaged and could be turned by the user. Conversely, if the doorknob 153 is of the free wheeling type it would become engaged and could be turned by the user. In either case the turning of the doorknob by the user would allow both the bolt 152 and night latch 154 to be retracted and the door would be opened. Upon retraction of the bolt and night latch, latch block 156 falls back into place such as under the influence of gravity. Since the key would also be removed from the keyport, electromagnet 166 becomes deenergized and locking pivot 160 returns to the position indicated in FIG. 13 urged by leaf spring 164. Thus when the door is shut the normally locked condition of FIG. 13 is again established. Should the key be retracted before the door is opened the mechanism would remain in an unlocked condition until the lock bolt and night latch are retracted.

The arrangement shown in FIGS. 12-15 is particularly designed as a safeguard against tampering. For example the latch block 156 is maintained in its locking position under the action of its locking pivot 160. Since both the latch block and locking pivot are in a housing 157 in door jamb 161, there would be no way for unauthorized personnel to release the locking pivot from the outside short of cutting a hole through the wall. Conversely, the locking pivot would be quickly released by insertion of the proper key in the keyport.

To effect opening the door from the inside, a mechanically linked activating button 167 could be provided on the internal wall to release the locking pivot 160. In this respect as illustrated in FIG. 12 lever 160 may pivot with shaft 162 which terminates in a non-circular socket 169 exposed at the internal wall 171. Button 167 is in the form of a key having a mating non-circular shank 173 which mates with socket 169. To open the door all the user need do is rotate button or key 167 which in turn causes shaft 162 to pivot lever 160 out of engagement with latch 156 to the position indicated in FIG. 14.

The means described for opening the door from the inside is not intended to limit this invention. A push button technique is quite obvious; and indeed, the lock set itself can be constructed in such a manner that the internal doorknob is turned to open the door. A practical lock set to operate with housing 157 will perform as follows:

1. Auxiliary latch extended (door open)
    a. Inside and outside knob free to retract latch bolt.
2. Auxiliary latch retracted (door closed, latch bolt dead-locked)
    a. Inside knob free to retract latch bolt.
    b. Outside knob rigid or free wheeling (not connected in any way to latch bolt).
        1. Upon extension of latch bolt condition 1. a becomes effective.

FIGS. 16-17 illustrate a further locking arrangement in accordance with this invention. The arrangement illustrated therein a quite similar to that shown in FIGS. 12-15 but is particularly advantageous where a narrow door jamb presents space problems. In this respect instead of having the electromagnet 166 to the side of locking lever 160 as illustrated in FIGS. 13-14 the electromagnet 166 is disposed above locking lever 160 with a pivoted angle shaped actuating member 168 therebetween. Arm 170 includes a projection 174 which acts as a stop for lever 160 in the condition illustrated in FIG. 16 while arm 172 reacts against lever 160 in the condition illustrated in FIG. 17. As illustrated in FIG. 16 when there is no key in the keyport electromagnet 166 is deenergized and leaf spring 164 reacting against stop 174 maintains locking lever 160 in contact with latch block 156. Upon energization of electromagnet 166, however, actuating member 168 is pivoted clockwise and arm 172 reacts against lever 160 to release latch block 156 whereupon night latch 154 is extended.

The FIGS. 16-17 arrangement would also include a mechanical unlatching arrangement such as shown in FIG. 12.

Although FIGS. 12-15 and 16-17 show particularly advantageous locking arrangements it is to be understood that less sophisticated arrangements might be used within the concepts of this invention. Thus as schematically illustrated in FIGS. 2 and 3 insertion of the proper card in the keyports might simply cause extension of a solenoid 72 against bolt 76 to permit the door to open.

Another method of opening the door utilizing the concepts of this invention is to use an electromagnetically operated strike plate. These type devices are commercially available and allows the use of the standard lock sets (Schlage, Russwin, etc.).

Othe variations are also possible within the scope of this invention. For example, the master console may include only two keyports. One keyport would be used exclusively for holding a card which is the duplicate of the guest's key, while the other or auxiliary keyport would selectively hold the maid's key, maintenance man's key, etc.

As is apparent from the foregoing description system 10 thus effectively controls not only the personnel who may enter a restricted area, but also the time of entry in addition to providing a means for instantaneously changing the lock combinations:

What is claimed is:

1. A security maintenance system for controlling entrance to and monitoring conditions at a restricted area comprising a locked barrier at the entrance to the area, a monitor station at the area for monitoring a plurality of conditions therein, an area keyport as an integral part of said monitor station, actuating means between said area keyport and said locked barrier, master console means disposed remote from said area keyport, said master console means having at least one master keyport, coded key means for insertion into said area and said master keyports, scanning means between said area keyport and said master console means for cyclically scanning said keyports in a time cycle of a plurality of phases to detect if at least one of a plurality of conditions exist at said area during phases of continuously repeated time cycle, one of said conditions being the presence of proper key means in said area keyport, and said scanning means initiating said actuating means for inactivating said locked barrier to permit entrance to the area when said area keyport and said master keyport have proper corresponding coded means inserted therein.

2. A system as set forth in claim 1 including bypass means whereby said scanning means by-passes later phases in a cycle when the presence of proper corresponding coded key means is detected.

3. A system as set forth in claim 1 wherein one of the conditions is the detection of a malfunction in said system.

4. A system as set forth in claim 1 wherein said actuating means includes power operated lock means set in an unlocking condition upon detection of a proper corresponding coded key means to periodically draw power only during its phase of the time cycle.

5. A system as set forth in claim 1 wherein there are a plurality of restricted areas with an area keyport and at least one master keyport for each area, said scanning means cyclically scanning each of the areas with each scanning cycle being divided into time phases.

6. A system as set forth in claim 5 wherein a set of master keyports are incorporated in said master console means corresponding to a single area keyport for permitting entrance to the area upon detection of proper corresponding coded key means in said area keyport and any of said master keyports.

7. A system as set forth in claim 5 wherein said master console means is a single master console unit.

8. A system as set forth in claim 6 wherein said plurality of areas are grouped into sets and at least one of the master keyports individually corresponding to a set of areas.

9. A system as set forth in claim 6 wherein said coded key means comprises a disposable non-conductive card having a pattern of holes therein.

10. A system as set forth in claim 6 including alarm means actuated by said scanning means when an object is inserted in said area keyport which does not match one of the coded key means in said master keyport.

11. A system as set forth in claim 10 wherein said scanning means includes comparison means and multiplex means.

12. A system as set forth in claim 1 including stimulus sensing means at the restricted area, and stimulus indicating means remote from its area for indicating predetermined conditions sensed by said stimulus sensing means.

13. A system as set forth in claim 12 wherein each keyport includes a housing, a slot in said housing, a plurality of pairs of electrically conductive spring fingers urged toward each other for making electrical contact, each coded key means being an insulative card sized to fit into said slot and between the fingers of said pairs of spring fingers, and said card having a pattern of holes therethrough to permit a corresponding arrangement of spring fingers to contact each other through said holes while the remaining spring fingers are insulated from each other.

14. A system as set forth in claim 1 wherein each card is made of a disposable non-conductive material with holes being arranged therein.

15. A system as set forth in claim 14 wherein said locked barrier is a door, a lock on said door, said lock including a latch bolt and a night latch, a door jamb, a housing in said door jamb, a strike plate over said housing disposed in the path of movement of said bolt and said night latch, an opening in said strike plate for permitting both said bolt and said night latch to enter said housing, locking means in said housing for maintaining said night latch retracted, and unlocking means in said housing responsive to said comparison means for inactivating said locking means to permit said night latch to be extended.

16. A system as set forth in claim 15 wherein said locking means comprises a latch plate abutting against said night latch, said latch plate having a shoulder, a locking lever engaged with said shoulder for holding said plate against said night latch, and said unlocking means being an electromagnet for moving said lever away from said shoulder.

17. A system as set forth in claim 16 wherein an angle shaped member is disposed between said lever and said electromagnet for controlling the position of said lever.

18. A system as set forth in claim 16 including inactivating means for mechanically removing said latch plate from against said night latch.

19. A system as set forth in claim 1 wherein each keyport includes a housing, a slot in said housing, a plurality of insulated non-conductive finger-like protrusions in said hosing adjacent said slot, and each coded key means being a card for causing electrical contact to be made by an arrangement of said protrusions upon insertion of said card into said slot.

20. A system as set forth in claim 1 including alarm means actuated by said scanning means when an object is inserted in said area keyport which does not match one of the coded key means in said master keyport.

21. A system as set forth in claim 1 wherein said scanning means includes comparison means and multiplex means.

22. A system as set forth in claim 1 including stimulus sensing means at the restricted area, and stimulus indicating means remote from its area for indicating predetermined conditions sensed by said stimulus sensing means.

23. A system as set forth in claim 1 wherein said locked barrier is a door, a lock on said door, said lock including a latch bolt and a night latch, door jamb, a housing in said door jamb, a strike plate over said housing disposed in the path of movement of said bolt and said night latch, an opening in said strike plate for permitting both said bolt and said night latch to enter said housing, locking means in said housing for maintaining said night latch retracted, and unlocking means in said housing responsive to said comparison means for inactivating said locking means to permit said night latch to be extended.

24. A system as set forth in claim 19 wherein said protrusions are switch actuating means.

25. A security maintenance system for controlling entrance to a restricted area comprising a locked barrier at the entrance to the area, an area keyport, actuating means between said area keyport and said locked barrier, a plurality of master keyports corresponding to and remote from said area keyport, coded key means for insertion into each of said area and said master keyports, sampling means between said area keyport and its master keyports for sampling said area keyport with respect to each of its master keyports and initiating said actuating means for inactivating said locked barrier to permit entrance to the area when said area keyport and one of its master keyports have proper corresponding coded key means inserted therein.

26. A security maintenance system for controlling entrance to a plurality of restricted areas comprising a locked barrier at the entrance to each of the areas, an area keyport at each of the areas, actuating means between each of said area keyports and its locked barrier, a master console disposed remote from said area keyports, said master console having a single master keyport corresponding to a set of said area keyports, coded key means for insertion into said master and said set of area keyports, sampling means between said area keyports and said master keyport for sampling said keyports and initiating said actuating means for inactivating a locked barrier to permit entrance to its area when its area keyport and said master keyport have proper corresponding coded key means inserted therein.

27. A system as set forth in claim 26 including a further set of area keyports and a further master keyport corresponding thereto.

28. In a method for controlling entrance to and monitoring conditions at a restricted area having a locked barrier at the entrance to the area and an area keyport at the area the improvement comprising cyclically scanning the area keyport and at least one master keyport corresponding thereto but remote therefrom, the scanning cycle beng divided into a plurality of time phases to detect if at least one of a plurality of conditions exist at the area including the presence of a proper key means in the area keyport and the corresponding master keyport, and continuously repeating the cycle.

29. In the method of claim 28 wherein there are a plurality of master keyports corresponding to each area keyport, and individual phases of each cycle including detecting if a proper corresponding coded key means are in the area keyport with respect to each master keyport.

30. In the method of claim 29 including by-passing later phases of a cycle when proper corresponding coded key means are detected.

* * * * *

UNITED STATES PATENT OFFICE
CERTIFICATE OF CORRECTION

Patent No. 3,786,471              Dated January 15, 1974

Inventor(s) HERSCHEL T. HOCHMAN, ET AL

It is certified that error appears in the above-identified patent and that said Letters Patent are hereby corrected as shown below:

Column 1, line 27, "3.392,558" should be --- 3,392,558 ---

Column 4, line 3, "detaied" should be --- detailed ---

Column 6, line 6, "to phasing" should be --- of phasing ---

Column 6, line 8, "conparison" should be --- comparison ---

Column 6, line 66, "housekeepper" should be --- housekeeper ---

Column 7, line 11, "200" should be --- 20 ---

Column 9, line 18, "plateform" should be --- platform ---

Column 11, line 62, "a" should be --- is ---

Column 14, line 17, "hosing" should be --- housing ---

Column 14, line 35, "door" should be --- a door ---

Signed and sealed this 25th day of June 1974.

(SEAL)
Attest:

WARD M. FLETCHER, JR.
Attesting Officer

C. MARSHALL DANN
Commissioner of Patents